United States Patent [19]

Sauermann

[11] 4,099,050
[45] Jul. 4, 1978

[54] CODABLE OPTICAL TRANSPONDER

[75] Inventor: Gerhard O. Sauermann, Lexington, Mass.

[73] Assignee: The United States of America as represented by the Secretary of the Air Force, Washington, D.C.

[21] Appl. No.: 56,019

[22] Filed: Jul. 10, 1970

[51] Int. Cl.² ............................................. H04B 9/08
[52] U.S. Cl. ....................................... 250/199; 350/98
[58] Field of Search ........................... 250/196–226, 250/199; 343/6.5 SS, 18 D; 350/97, 98

[56] References Cited

U.S. PATENT DOCUMENTS

| | | | |
|---|---|---|---|
| 2,130,256 | 9/1938 | Wilson | 350/97 |
| 2,428,713 | 10/1947 | Linderg, Jr. et al. | 250/199 |
| 2,461,005 | 2/1949 | Southworth | 343/18 D |
| 3,111,587 | 11/1963 | Rocard | 250/199 |
| 3,215,842 | 11/1965 | Thomas | 343/18 D |
| 3,225,177 | 12/1965 | Stites et al. | 235/61.11 |
| 3,227,882 | 1/1966 | Bissett et al. | 250/199 |
| 3,502,888 | 3/1970 | Stites | 250/226 |
| 3,521,280 | 7/1970 | Janco et al. | 343/6.5 SS |

OTHER PUBLICATIONS

Barber, "21 Ways to Pick Data Off Moving Objects", 10/63, pp. 82–83, Control Engineering, vol. 10, #10.

*Primary Examiner*—Nelson Moskowitz
*Attorney, Agent, or Firm*—Joseph E. Rusz; Arsen Tashjian

[57] ABSTRACT

A transponder illuminated by broadband optical radiation which is reflected back towards the illuminator by means of corner reflectors. In front of the corner reflectors are placed a plurality of narrow band filters which define the communication channels. The return signal will consist of the activation of a number of discrete channels corresponding to the number of filters used. The system is not restricted to the visible spectrum permitting infrared and ultraviolet radiation to be used to provide a covert communication system.

9 Claims, 3 Drawing Figures

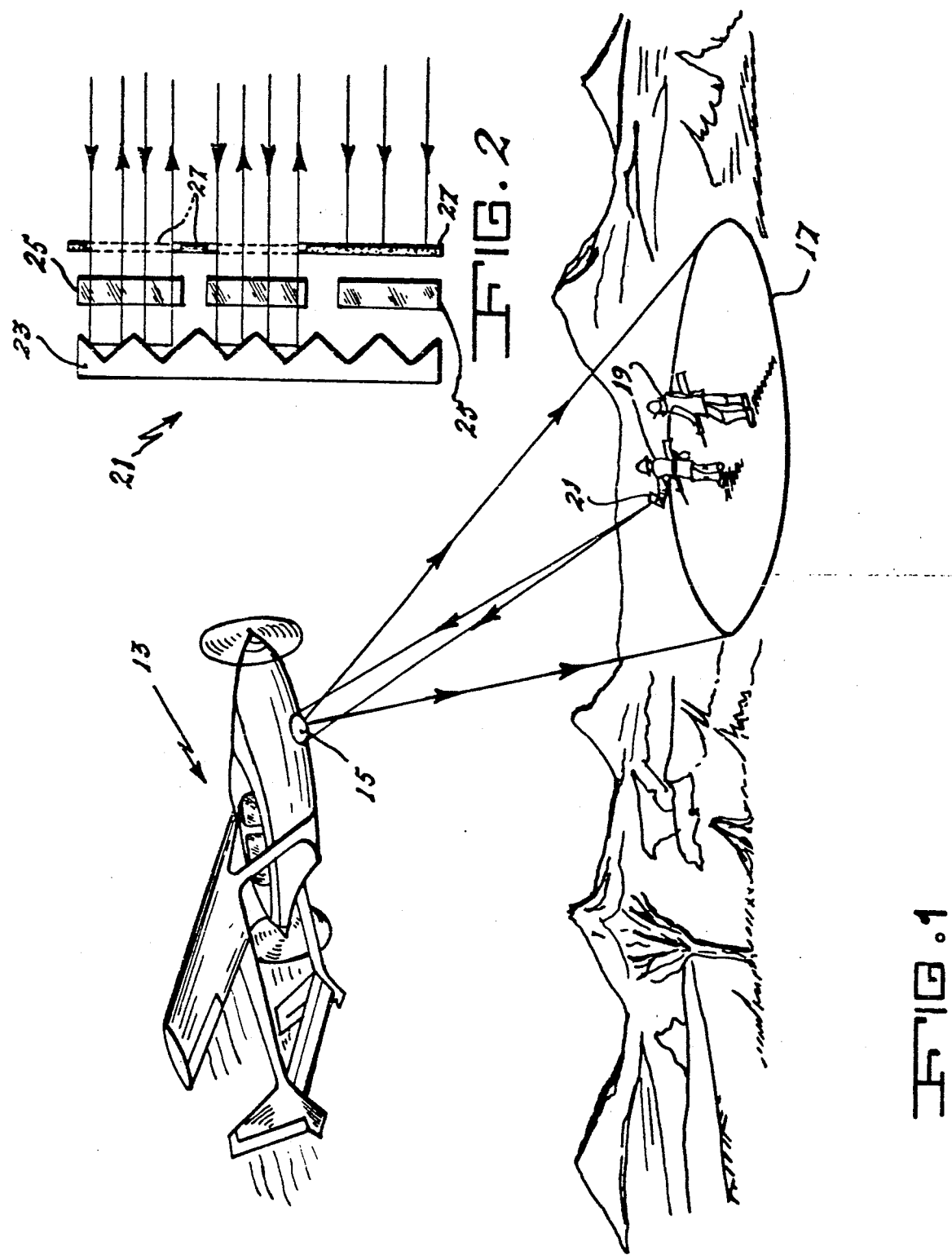

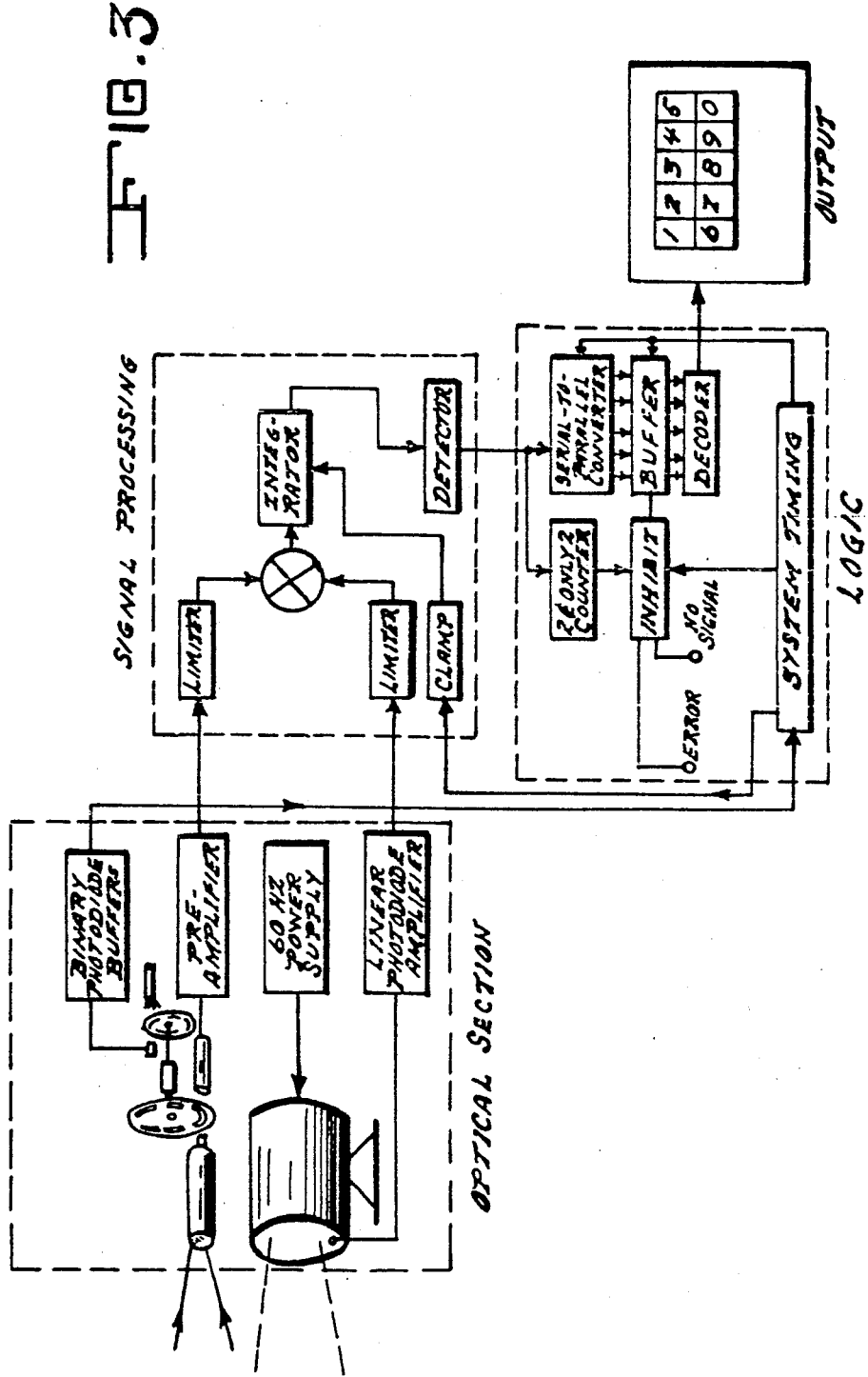

CODABLE OPTICAL TRANSPONDER

BACKGROUND OF THE INVENTION

This invention relates to a coded optical transponder system and, more particularly, the invention is concerned with providing a lightweight passive optical signalling device by utilizing corner reflectors and optical filters to transmit intelligence between two separated sites.

In general, communication between two remote sites is presently carried out by means of voice communication through the use of telephone or radio, or by Morse code light signals. In each of these systems, various situations arise which make the use of the system highly disadvantageous or impossible of operating, such as when transmitting classified communications and where ground forces are being tracked by a tactical air support team. Also, the problems of frequency allocation in regard to radio broadcasting and the problem of wires when involved with telephones limit the practical capability of these systems under certain conditions. In addition, each of the above known systems for intelligence communications are subject to being monitored by those for which the communications are not intended, and may be jammed or intercepted by undesirable recipients while also requiring considerable set-up time and maintenance.

Thus, there is an urgent need in the art for a simple and reliable communications system which is not subject to interception and jamming and which can be operated under adverse conditions by semi-skilled personnel without the requirements of expensive and time-consuming set-up and maintenance problems.

SUMMARY OF THE INVENTION

The present invention provides a system whereby a codable optical transponder transmits a signal to an interrogator. The transponder is lightweight and does not require any power. The elements involved are the transmitter, the transponder and a receiver collocated with the transmitter which consists basically of a telescope and a detector. The telescope does not have to resolve the transponder.

In principle, the transponder is illuminated by broadband optical radiation, ultraviolet, visible or infrared. The incident radiation is reflected back towards the illuminator by means of corner reflectors. In front of the corner reflectors are placed several narrow band filters which define the communication channels. While the source radiates a broadband spectrum, the return signal will consist of the activation of a number of discrete channels, this number depending on the number of filters used.

Alternatively, the transponder is illuminated by optical radiation in discrete bands, ultraviolet, visible, or infrared defining the communication channels. Again, the incident radiation is reflected back toward the illuminator by means of corner reflectors. In front of the corner reflectors are placed narrow band filters which correspond in their pass bands exactly to the discrete bands emitted by the illuminator.

The actual transmission of signals is achieved by blocking one or several channels in a preselected mode; that is, any combination of channels activated corresponds to a unique code from a finite set of possible codes.

The receiver coupled with the transmitter determines which transmission channels are activated and can be designed to determine the transmitted code. To achieve this, two basic principles are involved.

First, the receiver is also a multichannel device; that is, each channel has its own detector which indicates which of the individual channels is activated. The channel definition can be achieved by either optical filters or optical dispersing devices such as gratings and prisms.

Second, the receiver is a wideband detector but a spectral scanning device searches periodically for each channel in order to determine which channels are activated. Consequently, only one detector is necessary.

Accordingly, it is an object of the invention to provide a lightweight passive optical signalling device which can be built by utilizing corner reflectors and optical filters to define the responding signal channels.

Another object of the invention is to provide an optical signalling device wherein the orientation of the transponder with respect to the illuminator can be varied over wide limits.

Still another object of the invention is to provide a transponder wherein combinations of responding signal channels can be utilized to produce codes which can be transmitted to the interrogator.

A further object of the invention is to provide a transponder wherein the individual codes that may be obtained by different combinations of activated responding channels may be preassigned to convey different items of information.

A still further object of the invention is to provide a signalling system wherein the transponder is passive and its response to interrogation can only be received and interpreted by the detector collocated and properly coupled with the interrogation device. Thus, the invention provides a useful, secure type of communication within line of sight.

Another still further object of the invention is to provide a signalling device which utilizes a technique which is not restricted to the visible spectrum allowing infrared or ultraviolet radiation to be used to provide a covert communication system.

These and other objects, features and advantages will become more apparent after considering the description that follows taken in conjunction with the attached drawings wherein like numbers are used throughout to identify like elements.

DESCRIPTION OF THE DRAWINGS

FIG. 1 is a general pictorial view of a coded optical transponder system according to the invention;

FIG. 2 is a schematic representation of the transponder as employed in the present invention showing the incident and reflected light waves; and FIG. 3 is a block diagram of the system showing the principal functional elements and their relationship.

DESCRIPTION OF A PREFERRED EMBODIMENT

Referring now to the drawings, there is shown in FIG. 1, one use of the invention as a covery means of exchanging tactical information. In particular, for night operations, an airborne tactical air support team is provided with an aircraft 13 which is equipped with a steerable low-light-level TV or forward-looking infrared imaging system 15 capable of tracking an observed object on the ground. This instrumentation includes an imaging capability outside the visible spectrum, either ultraviolet or infrared, for which supplemental illumination is provided by an onboard covert optical source.

The present invention allows this covert beam which covers the area enclosed in the circle 17, and which is ordinarily intended for supplemental illumination, to be used for the purpose of interrogating a friendly ground patrol 19. This is accomplished by using the covert beam to produce an interrogation/reply link between the ground patrol 19 and the aircraft 13. An optical retroreflective transponder 21, shown in schematic detail in FIG. 2, is held by the ground patrol 19 and consists of an array of corner reflectors 23 in front of which is placed an array of optical filters 25. Each filter 25 passes a distinct portion of the spectrum. While the covert illumination is broadband, the beam returned by the transponder 21 contains energy only within the transmission band of the filters 25.

Signalling is accomplished by blocking some of the filters 25 with an opaque mask 27. A set of masks is provided, each one of which passes a unique set of transmission bands and thus corresponds to a unique coded signal.

In a preferred embodiment of the invention, the transponder 21 is a passive hand-held device comprising an array of five optical bandpass filters 25 placed over an array of retroreflective elements 23. The nominal channel band centers for the five filters are: 4500Å, 5000Å, 5500Å, 6000Å, 6500Å. The nominal bandwidth for each channel is 200Å. In operation, a mask 27 is inserted which blocks out all but two of the five filters 25. By selecting the appropriate masks 27, all ten possible combinations of filters can be obtained.

The retroreflective property of the transponder provides a maximum signal return back along the axis of the illumination beam. Several operational advantages are thus obtained including (1) maximum brightness of the transponder 21 as viewed from the aircraft 13, (2) ease of pointing the transponder 21 which can be as much as 30° off axis with very little reduction in brightness, and (3) concealment of the return beam from enemy forces. The retroreflective array 23 of the transponder 21 is made up of molded faceted elements similar to the reflective elements used on bicycles. The resulting array is very thin (less than 1/10 inch) and lightweight. The directivity characteristic of the retroreflective element 23 provides that most of the returned energy is within a beamwidth of 0.2° relative to the axis of illumination.

In FIG. 3, there is shown a block diagram of the entire optical transponder system including the illuminator and receiver sections. The drawing shows the optical section which provides the illumination and receives the reflected signal from the transponder. The signal is then processed through various electronic components to produce a display which indicates the intelligence contained in the coded transponder held by the friendly ground patrol 19.

In an alternative illuminating technique where the transponder is illuminated by optical radiation in discrete bands, the interrogating and responding channels may be generated by utilizing several laser beams at different frequencies for the illuminator. It is also possible to communicate from the illuminator to the transponder by selecting radiation channels at the illuminator and by providing the transponder with a readout service. Depending on range and illumination conditions, a self-contained power unit for the transponder may be necessary, since operation in this mode may require amplification and hence a power supply.

The concept of the simple passive manually operated transponder can be extended to provide higher information data rates by automatic or semi-automatic programming of channel activation, both by the interrogator and by the transponder. It is possible to extend this concept to provide two-way signalling between the interrogator/receiver combination and the transponder. This permits messages formed by sequences of codes to be exchanged.

The hereinbefore described coded optical transponder communications system has many uses, particularly for the military, including communication between small units of ground troops and aircraft and as a codable identification of friendly forces device for ground troops, trucks and armored vehicles, and boats. Also, the device is useful as a coded ground marker for position determination to aid support aircraft and as a lightweight, passive device that may be left unattended or easily elevated to a position in which it will be in line of sight of an interrogator/receiver combination. The system provides a general purpose line-of-sight duplex digital communications link.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention is readily adaptable for use to solve many military communication problems, particularly where covert digital signalling is required during an airborne imaging/surveillance operation.

Also, it should be understood that various changes, alterations, modifications and substitutions with respect to the construction details can be made in the arrangement of the several elements without departing from the true spirit and scope of the appended claims.

Having thus described my invention, what I claim as new and desired to secure by Letters Patent of the United States is:

1. In an optical line-of-sight communication system having an interrogator section and a receiver section both located in substantially the same general area for generating and receiving radiation signals, respectively; a remotely positioned codable optical transponder comprising, a corner reflector located in line-of-sight with said interrogator section for receiving and reflecting radiation therefrom, at least the narrow band optical filter positioned immediately in front of said corner reflector and operatively attached thereto to absorb all radiation from said interrogator except that of specific wavelengths, and a coded opaque mask positioned immediately in front of said filter in operative association therewith to prevent a predetermined portion of the radiation from the interrogator from from reaching said corner reflector, said corner reflector, optical filter and opaque mask being constructed as a portable unit capable of being handcarried by a person, the configuration of said mask being designed to allow radiation to reach only specified areas of said corner reflector thereby forming a signal containing intelligence corresponding to the mask configuration which is subsequently reflected back to the receiver section of the communication system.

2. The communication system defined in claim 1 wherein said codable optical transponder is positioned on the ground and the interrogator and receiver are positioned in an aircraft within line-of-sight view of said transponder.

3. The communication system defined in claim 2 wherein the radiation reflected by said transponder is in the visible range.

4. The communication system defined in claim 2 wherein the radiation reflected by said transponder is in the infrared range.

5. The commmunication system defined in claim 2 wherein the radiation reflected by the transponder is in the ultraviolet range.

6. The communication system defined in claim 2 wherein a plurality of filters of various absorption characteristics define the responding signal channels to the receiver.

7. The communication system defined in claim 2 wherein the source of the radiation reflected by said transponder is in discrete bands.

8. The communication system defined in claim 2 including a readout device to receive color coded messages from the interrogator.

9. The communication system defined in claim 2 including a self-contained power unit for readout to increase the range of the communication system.

* * * * *